Jan. 31, 1961 R. L. SWIGGETT 2,970,238

PRINTED CIRCUIT ARMATURE

Filed Feb. 12, 1959 3 Sheets-Sheet 1

INVENTOR.
ROBERT L. SWIGGETT
BY
Charles A. Blank
ATTORNEY

Jan. 31, 1961 R. L. SWIGGETT 2,970,238

PRINTED CIRCUIT ARMATURE

Filed Feb. 12, 1959 3 Sheets-Sheet 2

INVENTOR.
ROBERT L. SWIGGETT

BY *[signature]*

ATTORNEY

Jan. 31, 1961 R. L. SWIGGETT 2,970,238

PRINTED CIRCUIT ARMATURE

Filed Feb. 12, 1959 3 Sheets-Sheet 3

INVENTOR.
ROBERT L. SWIGGETT
BY
Charles A. Black
ATTORNEY

United States Patent Office 2,970,238

Patented Jan. 31, 1961

2,970,238

PRINTED CIRCUIT ARMATURE

Robert L. Swiggett, Huntington, N.Y., assignor, by mesne assignments, to Printed Motors Inc., New York, N.Y., a corporation of Delaware Filed Feb. 12, 1959, Ser. No. 792,733

8 Claims. (Cl. 310—268)

This invention relates to conductive devices for electromechanical energy converters and, more particularly, to devices such as armatures for direct-current and alternating-current motors and generators, field windings for alternating-current motors and the like. The invention is particularly directed to armatures having so-called printed, plated or etched conductors.

Motors and generators utilizing printed armatures are described in the copending application Serial No. 691,434, filed October 21, 1957, by F. H. Raymond and J. Henry-Baudot. The present invention relates to improvements in armatures suitable for use in motors and generators of the type described in the aforesaid copending Raymond and Henry-Baudot application. In that application an armature is described having conductive patterns coated on the faces of a thin disk of insulating material. Connections between the patterns are made by means of tabs extending over the outer and inner edges of the disk. A soldering operation is necessary to make the connections and such connections may occasionally open or deteriorate.

As pointed out in the above-mentioned copending application, electrical rotating machines utilizing printed armatures have the great advantage of having an armature of very small inertia, imparting unusually good acceleration and deceleration characteristics to the motor.

It is an object of the present invention to provide a new and improved conductive device for an electromechanical energy converter which avoids the necessity of a soldering operation during manufacture.

It is another object of the invention to provide a new and improved armature for a direct current motor or generator which has a high degree of ruggedness.

In accordance with the invention, a conductive device for an electromechanical energy converter comprises an insulating member having a centrally located aperture and having surfaces coated with conductive patterns which have substantially circular inner and outer boundaries and which have interconnections through the insulating member disposed in a plurality of substantially circular rows in said patterns near said boundaries. A group of the interconnections between the patterns are disposed in a plurality of substantially circular rows near the centrally located aperture.

For a better understanding of the present invention, together with other and further objects thereof, reference is made to the following description taken in connection with the accompanying drawings, and its scope will be pointed out in the appended claims.

Referring to the drawings.

Figure 3:
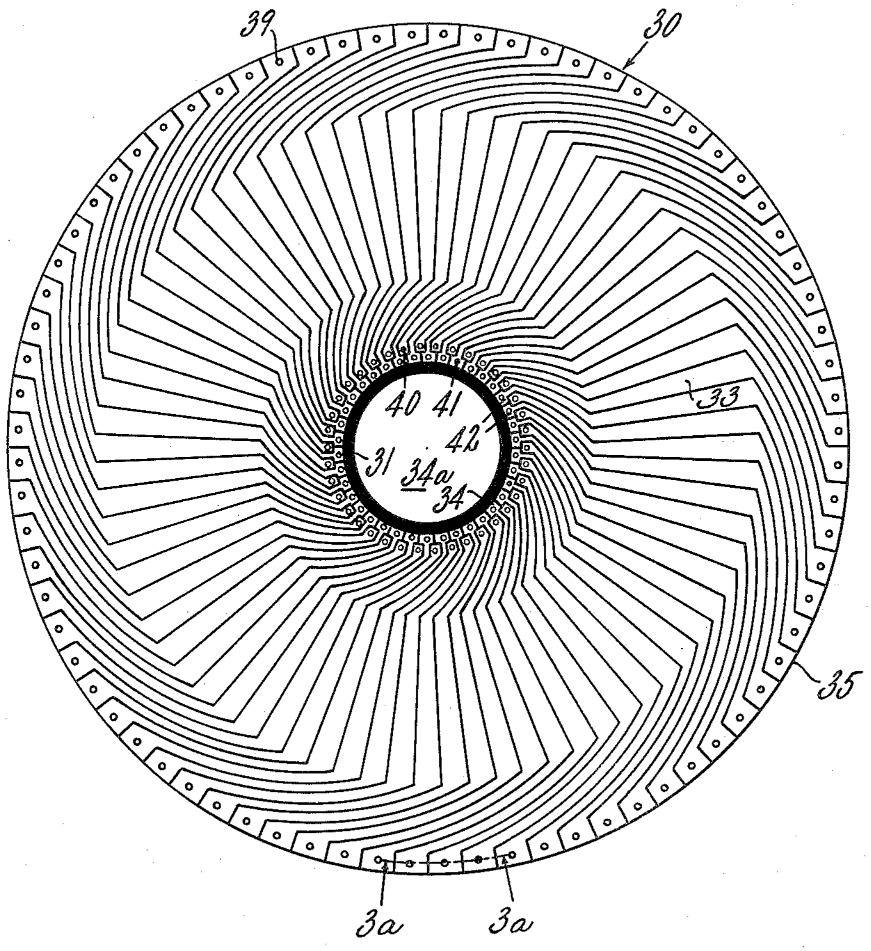
Fig. 3 is a plan view of the armature utilized in the Fig. 1 motor.
Figure 3A:
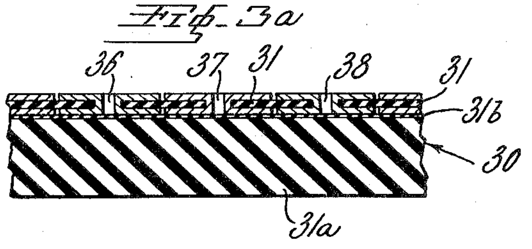
Figure 4:
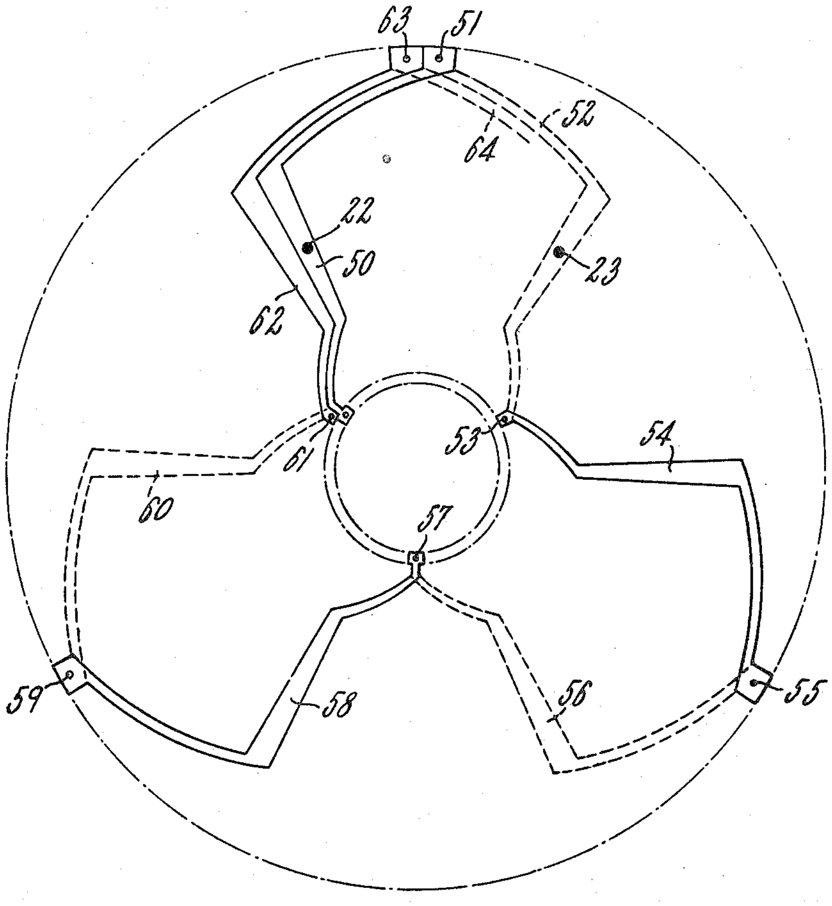

Fig. 3*a* is an enlarged sectional view taken along line 3*a*—3*a* of Fig. 3; and Fig. 4 is a fragmentary plan view of the Fig. 3 armature to represent conductive patterns on both sides of the armature.

Figure 2:
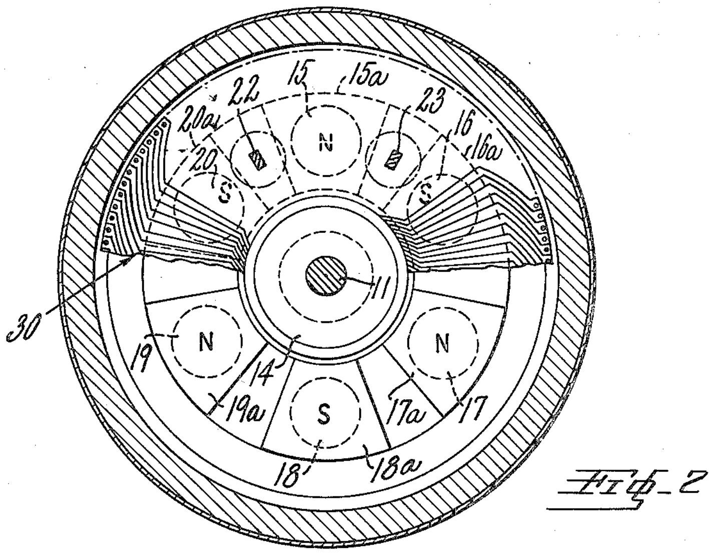
Fig. 2 is a sectional view, taken along line 2—2 of Fig. 1, with the armature partly broken away.
Figure 1:
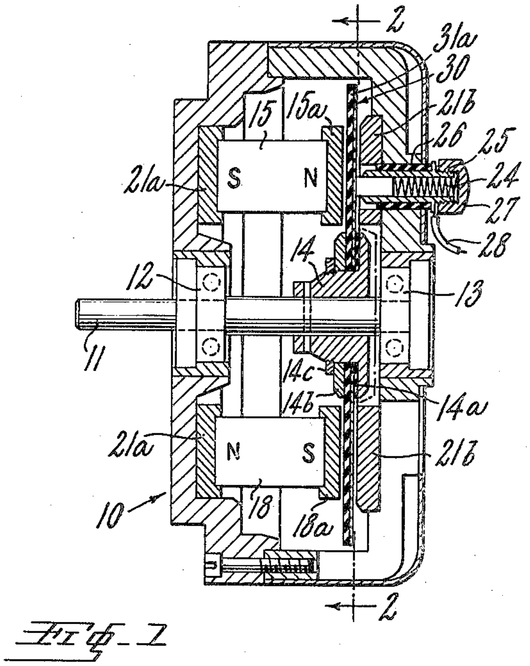
Fig. 1 is a sectional view along a central plane of a direct-current motor utilizing a printed armature constructed in accordance with the present invention with one of the brush mounts shown in section.

Referring now more particularly to Fig. 1 of the drawings, the direct-current motor there represented comprises a motor housing 10 supporting a central shaft 11 journaled in suitable bearings 12, 13. An armature 30 constructed in accordance with the invention is mounted on a suitable supporting hub 14 between an insulating washer 14*a*, a clamp ring 14*b*, and threaded nut 14*c*. As is apparent in Fig. 2, the motor is, for example, a six-pole motor utilizing six permanent magnets, 15 to 20, inclusive, to establish a magnetic field. Suitable pole pieces 15*a* to 20*a*, inclusive, are attached to the magnets at one end as represented in Fig. 2. An annulus 21*a* of ferromagnetic material is attached to the other end of the magnets to provide a path for magnetic flux. The magnets are mounted to provide fields of alternate polarity through adjacent regions of the armature as represented by the north-south symbols N-S of Figs. 1 and 2. A ferromagnetic annulus 21*b*, is positioned on the other side of the armature from the magnets to minimize the air gap in the magnetic field and to complete the path for magnetic flux. Suitable brushes 22, 23, represented in section in Fig. 2, are positioned approximately midway between magnets 20 and 15 and between magnets 15 and 16 to supply current to the motor, as will be described in detail subsequently.

Referring to Fig. 1, brush 23 is maintained in position by a suitable spring 24 mounted in a sleeve 25 within an insulating support 26. A cap of insulating material 27 is threaded on the sleeve 25 for clamping an electrical lead 28 thereto. The brush 22, and a corresponding electrical lead (not shown) are similarly mounted and connected electrically.

Referring now more particularly to Fig. 3 of the drawings, the armature 30 constructed in accordance with the invention is represented in plan view. The armature comprises an insulating member having surfaces coated with conductive patterns preferably having substantially circular inner and outer boundaries and which have interconnections comprising conductive coatings bounding apertures through the insulating member preferably disposed in a plurality of circular rows in the patterns near the boundaries. More particularly, the insulating member preferably comprises a suitable sheet material such as Mylar, which is a commercially available polyester film made by E. I. du Pont de Nemours & Company, Inc. The insulating member 31 is apparent in Fig. 3*a* which is a sectional view of a portion of the armature along lines 3*a*—3*a* of Fig. 3. The Mylar sheet preferably is a film having a thickness of, for example, .005 inch. The Mylar sheet is also represented by the lines representing conductor boundaries in Fig. 3. The conductive pattern represented in Fig. 3 is repeated on the other side of the sheet 31, partially represented in Fig. 4, which is a fragmentary view of the armature and its conductive patterns. Thus, the armature pattern on each side of the sheet 31 appears as represented in Fig. 3 when each pattern is viewed from the side of the sheet 31 on which that patten appears. The radial portions 33 of the conductors on both sides of the aramture may coincide. The conductive patterns will be described in detail subsequently.

The insulating member may also be, for example, a sheet of epoxy-glass laminate sufficiently thick to be rigid and self-supporting. Also, it is not necessary that the insulating member comprise insulating material in its entirety. For example, the insulating member may have a central conductive core covered by insulating material to provide Eddy-current damping.

The insulating sheet 31 has a centrally located aperture 34a for mounting the armature on the hub 14 of Fig. 1 and is supported by an insulating disk 31a of circular shape cemented to the conductive pattern. The conductive patterns have substantially circular inner and outer boundaries 34 and 35. Interconnections between the conductive patterns comprise conductive coatings, for example, 36, 37, and 38 of Fig. 3a, bounding apertures through the insulating material and disposed in a plurality of substantially circular rows 39, 40 and 41 near the boundaries. The interconnections in the outermost circle 39 are connected to all conductors of the conductive patterns. The interconnections in the innermost circle 41 are connected to alternate conductors in each conductive pattern. The interconnections in the other inner circle 40 are connected to conductors intervening the alternate conductors in the conductive patterns. The alternate conductors connected to the innermost circle 41 are terminated in closely spaced adjacent conductive regions 42, 42 separated by insulating material. The intervening conductors are terminated on each face of the sheet 31 by conductive regions separated by the alternate conductors and insulating material.

Thus it will be seen in Fig. 3 that alternate connections to the conductors are staggered, that is, connections to alternate conductors are in the innermost circle 41 and connections to the intervening conductors are in the adjacent circle 40, preferably midway between the apertures of circle 41. This construction of the armature is of importance because it provides substantial regions of the conductors in which coated apertures are located. The apertures may, therefore, be of substantial size, for example, .02 inch on a circle of .7 inch diameter, permiting a coating of sufficient thickness and area to conduct the necessary curent. This construction of the conductors with the apertures arranged in a plurality of circular rows near the central aperture 34a makes the manufacture of small armatures commercially practical.

The conductor pattern and the corresponding pattern for current flow through the armature will be partially traced with reference to Fig. 4. Assuming current to enter the motor at brush 22 disposed in contact with conductor 50, current flows along conductor 50 through aperture 51 to conductor 52 on the other side of the insulating sheet, through aperture 53 along conductor 54, through aperture 55 along conductor 56 on the other side of the insulating sheet, through aperture 57 along conductor 58, through aperture 59 along conductor 60 on the other side of the insulating sheet, and through aperture 61 along conductor 62 adjacent conductor 50. Current continues along conductor 62 through aperture 63 along conductor 64 on the other side of the insulating sheet adjacent conductor 52. Current flow continues in this manner through every conductor of the armature until it reaches the final conductor (not shown) on the same face of the sheet as conductor 50 and directly under brush 23.

A method of manufacturing the armature wil be briefly described. A sheet of Mylar is drilled, perforated or punched to form apertures in the pattern represented in Fig. 3. The sheet is then coated with a copper film on all exposed surfaces, including the walls of the apertures, to a thickness of approximately .00001 inch by immersion in an electroless copper deposition solution ordinarily employed in the manufacture of printed circuits. The copper-coated faces are then coated with a suitable screen printing-ink plating resist, known to the art, which resists copper electroplating and which is printed on the copper to form the patern to be etched, represented by the black lines of Fig. 3. The armature is then copper-plated on its faces and through its apertures. After plating to the desired copper thickness (for example, approximately .005 for a three inch diameter armature), the part is removed from the electroplating bath and the ink is cleaned off, leaving exposed the thin electroless copper film which was under the ink. The armature is then immersed briefly in an etching solution, which removes the thin electroless copper film which was under the ink to form the conductors represented in Fig. 3.

It should also be understood that the conductive coating on the surfaces of the insulating sheet may comprise, for example, a copper-foil material which is laminated to the insulating sheet and is subsequently etched. Also, the conductively coated apertures through the insulating material may be filled with conductive or insulating material, if desired.

While applicant does not wish his invention to be limited to any particular set of dimensions, the following are representative dimensions which have been successfully employed in an embodiment constructed in accordance with the invention:

Outer diameter of conductive pattern 3.6 inches
Inner diameter of conductive pattern 0.70 inch
Number of conductors on each surface 76
Thickness of Mylar sheet 31 .005 inch
Thickness of conductors 33 .004 inch
Thickness of supporting disk 31a .030 inch
Diameter of apertures in row 39 .030 inch
Diameter of apertures in row 40 .020 inch
Diameter of apertures in row 41 .020 inch
Center-to-center spacing of apertures in row 39 0.150 inch
Center-to-center spacing of apertures in row 40 0.070 inch
Center-to-center spacing of apertures in row 41 0.060 inch
Adjacent edge spacing between conductors 33 .005 inch
Width of alternate conductors between apertures of row 40 .020 inch
Width of intervening conductors at row 40 .030 inch
Width of intervening conductors at inner-boundary 34 .050 inch
Maximum width of central radial portions of conductors 33 0.110 inch From the foregoing description, it will be apparent that an armature constructed in accordance with the invention has the important advantage that it may be manufactured without requiring soldering operations. Because the interconnections between conductive patterns of the armature are an integral part of the armature structure within the boundaries of the insulating support of the armature, the armature has a high degree of ruggedness and is capable of providing satisfactory operation over an indefinitely long period. Moreover, interconnections between conductive patterns of the armature may be conveniently made as part of the printing operations of manufacture. Armatures of small size may be readily constructed in accordance with this invention. Also, armatures for diverse purposes may be constructed by cementing a conductively coated Mylar film to a supporting disk having either an insulating or conductive core.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. A conductive device for an electromechanical energy converter comprising: an insulating member having a centrally located aperture and having surfaces coated with conductive patterns which have substantially circular inner and outer boundaries and which have interconnections through said insulating member disposed in a plurality of substantially circular rows near said boundaries, a group of said interconnections between said patterns being disposed in a plurality of substantially circular rows near said centrally located aperture.

2. An armature for an electrical rotating machine comprising: a thin sheet of insulating material having surfaces coated with conductive patterns which have substantially circular inner and outer boundaries and which have interconnections through said insulating material disposed in a plurality of substantially circular rows in said patterns near said boundaries, a group of said interconnections between said patterns being disposed in a plurality of substantially circular rows near said inner boundary, and a circular disk adherent to the conductive pattern on one surface of said sheet and electrically insulated therefrom for supporting said sheet.

3. A conductive device for an electromechanical energy converter comprising: a sheet of insulating material having a centrally located aperture of substantially circular boundary and having surfaces coated with conductive patterns which have substantially circular inner and outer boundaries and which have interconnections comprising conductive coatings bounding apertures through said insulating material, a group of said interconnections being disposed in an outer circle near said outer boundary of said patterns and concentric therewith and another group of said interconnections being disposed in a plurality of inner circles near said centrally located aperture and concentric with said outer circle of interconnections.

4. An armature for an electrical rotating machine comprising: a sheet of insulating material having a centrally located aperture of substantially circular boundary and having surfaces coated with conductive patterns which have substantially circular inner and outer boundaries and which have interconnections comprising conductive coatings bounding apertures through said insulating material, a group of said interconnections being disposed in an outer circle near said outer boundary of said patterns and concentric therewith and another group of said interconnections being disposed in two adjacent inner circles near said centrally located aperture and concentric with said outer circle.

5. A conductive device for an electromechanical energy converter comprising: an insulating member having surfaces coated with conductive patterns which have inner and outer boundaries and which have interconnections comprising conductive coatings bounding apertures through said insulating member, a group of said interconnections being disposed in an outer row near said outer boundary of said patterns and another group of said interconnections being disposed in a plurality of adjacent inner rows near said inner boundary of said patterns, said interconnections in said outer row being connected to all conductors of said patterns, the interconnections in the innermost row being connected to alternate connections in each conductive pattern, and the interconnections in the other inner row being connected to conductors in said patterns intervening said alternate conductors.

6. An armature for an electrical rotating machine comprising: a sheet of insulating material having a centrally located aperture of substantially circular boundary and having surfaces coated with conductive patterns which have substantially circular inner and outer boundaries and which comprise groups of individual conductors and which have interconnections between conductors comprising conductive coatings bounding apertures through said insulating material, a group of said interconnections being disposed in an outer circle near said outer boundary of said patterns and concentric therewith and another group of interconnections being disposed in a plurality of inner circles near said centrally located aperture and concentric with said outer circle of interconnections, said interconnections in said outer circle being connected to all conductors of said patterns, the interconnections in the innermost circle being connected to alternate conductors in each conductive pattern, and the interconnections in the other inner circle being connected to conductors in said patterns intervening said alternate conductors.

7. An armature for an electrical rotating machine comprising: a sheet of insulating material having a centrally located aperture of substantially circular boundary and having surfaces coated with conductive patterns which have substantially circular inner and outer boundaries and which comprise groups of individual conductors and which have interconnections between conductors comprising conductive coatings bounding apertures through said insulating material, a group of said interconnections being disposed in an outer circle near said outer boundary of said patterns and concentric therewith and another group of said interconnections being disposed in two adjacent inner circles near said centrally located aperture and concentric with said outer circle, said interconnections in said outer circle being connected to all conductors of said patterns, the interconnections in the innermost circle being connected to alternate conductors in each conductive pattern, and the interconnections in the other inner circle being connected to conductors intervening said alternate conductors in said conductive patterns, said alternate conductors connected to said innermost circle being terminated in closely spaced adjacent conductive regions separated by said insulating material, and said intervening conductors being terminated by conductive regions separated by said alternate conductors and by said insulating material.

8. An armature for an electrical rotating machine comprising: a thin sheet of insulating material having a centrally located aperture of substantially circular boundary and having surfaces coated with conductive patterns which have substantially circular inner and outer boundaries and which comprise groups of individual conductors with regions of substantially radial configuration and which have interconnections between conductors comprising conductive coatings bounding apertures through said insulating material, a group of said interconnections being disposed in an outer circle near said outer boundary of said patterns and concentric therewith and another group of said interconnections being disposed in two adjacent inner circles near said centrally located aperture and concentric with said outer circle, said interconnections in said outer circle being connected to all conductors of said patterns, the interconnections in the innermost circle being connected to alternate conductors in each conductive pattern, and the interconnections in the other inner circle being connected to conductors intervening said alternate conductors in said conductive patterns, said alternate conductors connected to said innermost circle being terminated in closely spaced adjacent conductive regions separated by said insulating material, and said intervening conductors being terminated by conductive regions separated by said alternate conductors and by said insulating material; and a disk of insulating material having a centrally located aperture and adherent to the conductive pattern on one surface of said thin sheet for supporting said sheet.

References Cited in the file of this patent

UNITED STATES PATENTS 2,441,960 Eisler _______________ May 25, 1948

FOREIGN PATENTS 1,160,490 France _______________ Mar. 3, 1958